US009758650B1

(12) United States Patent
Isitman et al.

(10) Patent No.: US 9,758,650 B1
(45) Date of Patent: Sep. 12, 2017

(54) PNEUMATIC TIRE

(71) Applicant: The Goodyear Tire & Rubber Company, Akron, OH (US)

(72) Inventors: Nihat Ali Isitman, Ettelbruck (LU); Marc Weydert, Bretrange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/353,782

(22) Filed: Nov. 17, 2016

(51) Int. Cl.
*C08L 9/00* (2006.01)
*C08K 3/36* (2006.01)
*C08K 3/04* (2006.01)

(52) U.S. Cl.
CPC ........... *C08L 9/00* (2013.01); *C08K 3/04* (2013.01); *C08K 3/36* (2013.01); *C08L 2205/025* (2013.01); *C08L 2205/06* (2013.01)

(58) Field of Classification Search
CPC .......................................................... C08L 9/00
USPC ......................................................... 523/156
See application file for complete search history.

(56) References Cited

U.S. PATENT DOCUMENTS

| | | | |
|---|---|---|---|
| 5,395,891 A | 3/1995 | Obrecht | |
| 5,504,135 A | 4/1996 | Ardrizzi | |
| 5,672,639 A | 9/1997 | Corvasce | |
| 5,901,766 A * | 5/1999 | Sandstrom | B60C 1/0016 152/905 |
| 6,103,808 A | 8/2000 | Hashimoto | |
| 6,127,488 A | 10/2000 | Obrecht | |
| 6,133,364 A | 10/2000 | Obrecht | |
| 6,146,520 A | 11/2000 | Gupte | |
| 6,207,757 B1 | 3/2001 | Obrecht | |
| 6,242,534 B1 | 6/2001 | Obrecht | |
| 6,248,929 B1 | 6/2001 | Kaimai | |
| 6,372,857 B1 | 4/2002 | Obrecht | |
| 6,399,697 B1 | 6/2002 | Takasaki | |
| 6,410,816 B2 | 6/2002 | Takasaki | |
| 6,437,205 B1 * | 8/2002 | Miller | C08F 36/06 525/236 |
| 6,608,125 B2 | 8/2003 | Cruse | |
| 7,919,571 B2 | 4/2011 | Nakagawa | |
| 8,669,339 B2 | 3/2014 | Okabe | |
| 9,222,536 B2 | 12/2015 | Nagata | |
| 9,441,098 B1 * | 9/2016 | Isitman | C08L 9/00 |
| 2001/0007049 A1 * | 7/2001 | Takasaki | C10G 21/00 585/833 |
| 2001/0023307 A1 | 9/2001 | Kaimai | |
| 2002/0000280 A1 | 1/2002 | Scholl | |
| 2002/0045697 A1 | 4/2002 | Sohnen | |
| 2003/0130535 A1 | 7/2003 | Deschler | |
| 2006/0041063 A1 | 2/2006 | Cruse | |
| 2011/0114240 A1 * | 5/2011 | Skurich | B60C 1/00 152/554 |
| 2012/0309902 A1 * | 12/2012 | Okabe | C08C 19/00 525/237 |

FOREIGN PATENT DOCUMENTS

| | | |
|---|---|---|
| EP | 0839891 B1 | 6/2004 |
| ES | 2122917 | 12/1998 |
| JP | 2002097369 A | 4/2002 |

* cited by examiner

*Primary Examiner* — Doris Lee
(74) *Attorney, Agent, or Firm* — John D. DeLong

(57) ABSTRACT

The present invention is directed to a pneumatic tire having a tread comprising a vulcanizable rubber composition comprising, based on 100 parts by weight of elastomer (phr),
(A) from about 50 to about 100 phr of a first polybutadiene rubber comprising from 65 to 95 percent of repeat units derived from butadiene in cis-1,4 insertion, 4 to 30 percent by weight of repeat units derived from butadiene in vinyl-1,2 insertion, and less than or equal to 5 percent by weight of repeat units derived from butadiene in trans-1,4 insertion, −80 to −105° C.;
(B) up to 50 phr of at least one rubber selected from the group consisting of a second polybutadiene having a cis-1,4 content greater than 95 percent and a Tg ranging from −80 to −110° C., natural rubber, and synthetic polyisoprene having a cis-1,4 content greater than 95 percent by weight and a Tg ranging from −50 to −80° C.;
(C) from 20 to 70 phr of a process oil having a polycyclic aromatic content of less than 3 percent by weight as determined by the IP346 method; and
(D) from 50 to 150 of a filler selected from the group consisting of carbon black and silica.

4 Claims, No Drawings

PNEUMATIC TIRE

BACKGROUND

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Snow/ice tires need to demonstrate excellent grip properties on snowy and icy roads especially at very low ambient temperatures. Simultaneously, the tread compound of snow/ice tires is required to show low hysteresis to promote lower rolling resistance. To achieve a low stiffness at low temperatures and low rolling resistance, it is preferable for the treads of snow/ice tires to use butadiene rubbers that have high (i.e. >95%) 1,4 cis butadiene content, generally referred to as cis-BR. However, an undesirable effect occurs through incorporating high levels of cis-BR in the tread with prolonged exposure to sufficiently low temperatures during service. This exposure may induce a phenomenon called "cold crystallization" leading to a significant increase in the stiffness of tread undermining the grip performance at low temperatures.

SUMMARY

The present invention is directed to a pneumatic tire having a tread comprising a vulcanizable rubber composition comprising, based on 100 parts by weight of elastomer (phr), (A) from about 50 to about 100 phr of a first polybutadiene rubber comprising from 65 to 95 percent of repeat units derived from butadiene in cis-1,4 insertion, 4 to 30 percent by weight of repeat units derived from butadiene in vinyl-1,2 insertion, and less than or equal to 5 percent by weight of repeat units derived from butadiene in trans-1,4 insertion, Tg ranging from −80 to −105° C.;

(B) up to 50 phr of at least one rubber selected from the group consisting of a second polybutadiene having a cis-1,4 content greater than 95 percent and a Tg ranging from −80 to −110° C., natural rubber, and synthetic polyisoprene having a cis-1,4 content greater than 95 percent by weight and a Tg ranging from −50 to −80° C.;

(C) from 20 to 70 phr of a process oil having a polycyclic aromatic content of less than 3 percent by weight as determined by the IP346 method; and (D) from 50 to 150 of a filler selected from the group consisting of carbon black and silica.

DESCRIPTION

There is disclosed to a pneumatic tire having a tread comprising a vulcanizable rubber composition comprising, based on 100 parts by weight of elastomer (phr), (A) from about 50 to about 100 phr of a first polybutadiene rubber comprising from 65 to 95 percent of repeat units derived from butadiene in cis-1,4 insertion, 4 to 30 percent by weight of repeat units derived from butadiene in vinyl-1,2 insertion, and less than or equal to 5 percent by weight of repeat units derived from butadiene in trans-1,4 insertion, Tg ranging from −80 to −105° C.;

(B) up to 50 phr of at least one rubber selected from the group consisting of a second polybutadiene having a cis-1,4 content greater than 95 percent and a Tg ranging from −80 to −110° C., natural rubber, and synthetic polyisoprene having a cis-1,4 content greater than 95 percent by weight and a Tg ranging from −50 to −80° C.;

(C) from 20 to 70 phr of a process oil having a polycyclic aromatic content of less than 3 percent by weight as determined by the IP346 method; and (D) from 50 to 150 of a filler selected from the group consisting of carbon black and silica.

The present invention describes a novel method to inhibit the undesirable crystallization of polybutadiene in ice/snow tire treads by introducing a certain desired level of 1,2 vinyl butadiene units along the polymer backbone in a range from 5% to 15% of the total polybutadiene weight. The incorporation of 1,2 units disrupts polymer chain stereoregularity and thus suppresses crystallization in the typical service temperature range of snow/ice tires. One conventional disadvantage of introducing 1,2 butadiene units, even though at low levels ranging from 5 to 15% of the total polybutadiene weight, is increased compound Tg. Another disadvantage stems from the polymerization process of such butadiene polymers generally using organometallic catalysts leading to significant 1,4 trans butadiene units incorporation in place of the more desirable 1,4 cis butadiene units. The rubber compounds made from a polybutadiene elastomer of 1,2 content in the desired range of 5% to 15% and that having a low cis content show increased hysteresis loss leading to an undesirable increase in rolling resistance compared to rubber compounds made from a polybutadiene elastomer of 1,2 content in the desired range of 5% to 15% and that having a high cis content.

The rubber composition includes from about 50 to about 100 phr of a first polybutadiene rubber comprising from 65 to 95 percent of repeat units derived from butadiene in cis-1,4 insertion, 4 to 30 percent by weight of repeat units derived from butadiene in vinyl-1,2 insertion, and less than or equal to 5 percent by weight of repeat units derived from butadiene in trans-1,4 insertion.

In one embodiment, the first polybutadiene rubber comprises from 85 to 95 percent of repeat units derived from butadiene in cis-1,4 insertion, from 5 to 15 percent by weight of repeat units derived from butadiene in vinyl-1,2 insertion, and less than or equal to 3 percent by weight of repeat units derived from butadiene in trans-1,4 insertion.

The first polybutadiene rubber is comprised of repeat units which are derived from 1,3-butadiene. By "units derived from" it is meant the monomer residues existing in the polymer after polymerization of the 1,3-butadiene monomer.

Suitable first polybutadiene rubber may be produced following the procedures disclosed in U.S. Pat. No. 8,669, 339. In one embodiment, the first polybutadiene rubber is Ubepol® MBR500 from Ube.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

The first polybutadiene has a glass transition temperature Tg ranging from −80 to −105° C. In one embodiment, the first polybutadiene has a Tg ranging from −90 to −98° C.

Another component of the rubber composition is up to 50 phr of at least one rubber selected from the group consisting of a second polybutadiene having a cis-1,4 content greater than 95 percent and a Tg ranging from −80 to −110° C., natural rubber, and synthetic polyisoprene having a cis-1,4 content greater than 95 percent by weight and a Tg ranging from −50 to −80° C. Suitable second polybutadiene rubbers may be prepared, for example, by organic solution polymerization of 1,3-butadiene. The second polybutadiene may be conveniently characterized, for example, by having at least a 95 percent cis 1,4-content and a glass transition temperature Tg in a range of from about −95° C. to about −105° C. Suitable second polybutadiene rubbers are available commercially, such as Budene® 1229 from Goodyear and the like, having a Tg of −108° C. and cis 1,4, content of 96%. The rubber composition includes from 20 to 70 phr of a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include low PCA oils, such as MES, TDAE, SRAE and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

Suitable TDAE oils are available as Tudalen® SX500 from Klaus Dahleke KG, VivaTec® 400 and VivaTec® 500 from H&R Group, and Enerthene® 1849 from BP, and Extensoil® 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 50 to about 150 phr of a filler selected from carbon black and silica.

The vulcanizable rubber composition may include from about 50 to about 130 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

The vulcanizable rubber composition may include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

The vulcanizable rubber composition may include both silica and carbon black in a combined concentration of from about 50 to about 150 phr, the majority of which is preferably silica.

Other fillers may be used in the rubber composition including, but not limited to, particulate fillers including ultra high molecular weight polyethylene (UHMWPE), particulate polymer gels such as those disclosed in U.S. Pat. No. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

Z-Alk-S$_n$-Alk-Z          I in which Z is selected from the group consisting of

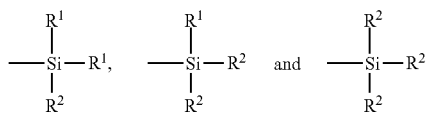

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl-sec-butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec-butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

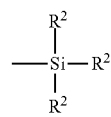

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, resins, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts or resins, including tackifier resins, comprise about 1 to 20 phr. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 3, phr. In another embodiment, combinations of a primary and a secondary accelerator might be used with the secondary accelerator being used in smaller amounts, such as from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example 1

This example illustrates the advantage of a rubber composition according to the invention. Rubber compounds were mixed according to the formulations shown in Table 1, with amounts given in phr. The compounds were cured and tested for physical properties as shown in Table 2.

TABLE 1

| Sample No. | 1 | 2 | 3 | 4 | 5 | 6 | 7 | 8 | 9 |
|---|---|---|---|---|---|---|---|---|---|
| Polybutadiene (Ni Catalyst)[1] | 100 | 87 | 87 | 67 | 67 | 50 | 50 | 0 | 0 |
| Polybutadiene (Li Catalyst)[2] | 0 | 13 | 0 | 33 | 0 | 50 | 0 | 100 | 0 |
| Polybutadiene (V Catalyst)[3] | 0 | 0 | 13 | 0 | 33 | 0 | 50 | 0 | 100 |
| Silica[4] | 90 | 90 | 90 | 90 | 90 | 90 | 90 | 90 | 90 |
| Carbon Black | 5 | 5 | 5 | 5 | 5 | 5 | 5 | 5 | 5 |
| Oil[5] | 50 | 50 | 50 | 50 | 50 | 50 | 50 | 50 | 50 |
| Antidegradants | 3 | 3 | 3 | 3 | 3 | 3 | 3 | 3 | 3 |
| Wax | 1.5 | 1.5 | 1.5 | 1.5 | 1.5 | 1.5 | 1.5 | 1.5 | 1.5 |
| Coupling Agent[6] | 5.6 | 5.6 | 5.6 | 5.6 | 5.6 | 5.6 | 5.6 | 5.6 | 5.6 |
| Sulfur | 1.6 | 1.6 | 1.6 | 1.6 | 1.6 | 1.6 | 1.6 | 1.6 | 1.6 |
| Accelerators[7] | 3.4 | 3.4 | 3.4 | 3.4 | 3.4 | 3.4 | 3.4 | 3.4 | 3.4 |

[1]Ni-catalyzed polybutadiene, Goodyear Chemical BUD1207, 97% cis, 2% trans, 1% vinyl.
[2]Li-catalyzed polybutadiene, Trinseo ® SE PB-5800, 44% cis, 44% trans, 12% vinyl.
[3]V-catalyzed polybutadiene, UBEPOL ® MBR500, 88% cis, 0% trans, 12% vinyl (metallocene catalyst).
[4]Hi-Sil 315G-D precipitated silica from PPG with a CTAB surface area of 125 $m^2$/g
[5]heavy naphthenic oil
[6]TESPD type silane coupling agent
[7]sulfenamide and diphenylguanidine type

TABLE 2

| Sample No. | 1 | 2 | 3 | 4 | 5 | 6 | 7 | 8 | 9 |
|---|---|---|---|---|---|---|---|---|---|
| Low Temperature Performance Indicator (Lower is better) [1] | | | | | | | | | |
| E' Modulus at −40° C. (MPa) | 42 | 34 | 34 | 23 | 21 | 18 | 19 | 21 | 18 |
| Rolling Resistance Indicator (Higher is better) [2] | | | | | | | | | |
| Rebound at 100° C. (%) | 57.3 | 57.4 | 58.0 | 56.0 | 58.7 | 56.7 | 58.5 | 56.4 | 60.8 |

[1] Low temperature moduli were determined by means of a GABO Eplexor tester. The test specimen is subjected to 0.25% sinusoidal deformation at 1 Hz.
[2] Rebound is a measure of hysteresis of the compound when subject to loading, as measured by ASTM D1054. Generally, the higher the measured rebound at 100° C., the lower the rolling resistance.

The rubber compounds made from a polybutadiene elastomer of 1,2 content in the desired range of 5% to 15% and that having a low cis content around 44% show increased hysteresis loss leading to an undesirable increase in rolling resistance compared to rubber compounds made from a polybutadiene elastomer of 1,2 content in the desired range of 5% to 15% and that having a high cis content around 88% as evidenced from Table 1 by comparing Rebound Resilience at 100° C. of Compound Samples 2, 4, 6 and 8 with that of Compound Samples 3, 5, 7 and 9, respectively.

Example 2

TABLE 3

| Sample No. | 10 | 11 | 12 | 13 | 14 | 15 |
|---|---|---|---|---|---|---|
| Natural Rubber | 50 | 50 | 50 | 25 | 25 | 25 |
| Polybutadiene (Ni Catalyst)[1] | 50 | 0 | 0 | 75 | 0 | 0 |
| Polybutadiene (Li Catalyst)[2] | 0 | 50 | 0 | 0 | 75 | 0 |
| Polybutadiene (V Catalyst)[3] | 0 | 0 | 50 | 0 | 0 | 75 |
| Silica[4] | 90 | 90 | 90 | 90 | 90 | 90 |
| Carbon Black | 5 | 5 | 5 | 5 | 5 | 5 |
| Oil[5] | 50 | 50 | 50 | 50 | 50 | 50 |
| Antidegradants | 3 | 3 | 3 | 3 | 3 | 3 |
| Wax | 1.5 | 1.5 | 1.5 | 1.5 | 1.5 | 1.5 |
| Coupling Agent[6] | 5.6 | 5.6 | 5.6 | 5.6 | 5.6 | 5.6 |
| Sulfur | 1.6 | 1.6 | 1.6 | 1.6 | 1.6 | 1.6 |
| Accelerators[7] | 3.4 | 3.4 | 3.4 | 3.4 | 3.4 | 3.4 |

[1] Ni-catalyzed polybutadiene, Goodyear Chemical BUD1207, 97% cis, 2% trans, 1% vinyl.
[2] Li-catalyzed polybutadiene, Trinseo ® SE PB-5800, 44% cis, 44% trans, 12% vinyl.
[3] V-catalyzed polybutadiene, UBEPOL ® MBR500, 88% cis, 0% trans, 12% vinyl (metallocene catalyst).
[4] Hi-Sil ® 315G-D precipitated silica from PPG with a CTAB surface area of 125 m$^2$/g
[5] heavy naphthenic oil
[6] TESPD type silane coupling agent
[7] sulfenamide and diphenylguanidine type

TABLE 4

| Sample No. | 10 | 11 | 12 | 13 | 14 | 15 |
|---|---|---|---|---|---|---|
| Low Temperature Performance Indicator (Lower is better) | | | | | | |
| E' at −40° C. (MPa) | 28 | 24 | 21 | 42 | 25 | 18 |
| Rolling Resistance Indicator (Higher is better) | | | | | | |
| Rebound at 100° C. (%) | 61.0 | 58.3 | 60.2 | 59.3 | 54.8 | 62.1 |

It becomes clear from Table 2 that NR/BR based compounds confirm the observed phenomenon that the use of a polybutadiene having a vinyl content around 11% and cis content around 44% helps lower the stiffness at low temperatures with a negative impact on rolling resistance compared to cis-BR (e.g. Sample 11 compared to Sample 10). With the use of a polybutadiene having a vinyl content around 11% and cis content around 88% further improves the low temperature performance and results in equal to better rolling resistance compared to a cis-BR (e.g. Sample 15 compared to Sample 13).

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a vulcanizable rubber composition comprising, based on 100 parts by weight of elastomer (phr),
    100 phr of elastomer consisting of rubbers from the following (A) and (B)
    (A) from 60 to 90 phr of a first polybutadiene rubber comprising from 65 to 95 percent of repeat units derived from butadiene in cis-1,4 insertion, 4 to 30 percent by weight of repeat units derived from butadiene in vinyl-1,2 insertion, and less than or equal to 5 percent by weight of repeat units derived from butadiene in trans-1,4 insertion, and a Tg ranging from −80 to −105° C.;
    (B) 40 to 10 phr of a second polybutadiene having a cis-1,4 content greater than 95 percent and a Tg ranging from −80 to −110° C.;
    (C) from 20 to 70 phr of a process oil having a polycyclic aromatic content of less than 3 percent by weight as determined by the IP346 method; and
    (D) from 50 to 150 of a filler selected from the group consisting of carbon black and silica.

2. The pneumatic tire of claim 1, wherein the first polybutadiene comprises from 85 to 95 percent of repeat units derived from butadiene in cis-1,4 insertion, from 5 to 15 percent by weight of repeat units derived from butadiene in vinyl-1,2 insertion, and less than or equal to 3 percent by weight of repeat units derived from butadiene in trans-1,4 insertion.

3. The pneumatic tire of claim 1, wherein the oil is selected from the group consisting of MES, TDAE, heavy naphthenic oils, SRAE oils and vegetable oils.

4. The pneumatic tire of claim 1, wherein the vulcanizable rubber composition comprises about 50 to about 130 phr of silica.

* * * * *